UNITED STATES PATENT OFFICE.

THOMAS A. EDISON, OF LLEWELLYN PARK, WEST ORANGE, NEW JERSEY, ASSIGNOR TO EDISON STORAGE BATTERY COMPANY, OF WEST ORANGE, NEW JERSEY, A CORPORATION OF NEW JERSEY.

PRODUCTION OF FINELY-DIVIDED METALS.

1,275,232.      Specification of Letters Patent.      Patented Aug. 13, 1918.

No Drawing.      Application filed December 22, 1911. Serial No. 667,366.

*To all whom it may concern:*

Be it known that I, THOMAS A. EDISON, a citizen of the United States, and a resident of Llewellyn Park, West Orange, Essex county, New Jersey, have invented certain new and useful Improvements in the Production of Finely-Divided Metals, of which the following is a specification.

My invention relates to the production of finely divided metals in a non-pyrophoric condition, and more particularly to the production of finely divided iron for use in alkaline storage batteries, particularly in that type of such batteries as are described in my prior patents. In my Patents Nos. 727,117 and 727,118, dated May 5, 1903, I describe processes of manufacturing electrolytically-active finely divided iron for use in alkaline storage batteries, and in some aspects my present invention is an improvement on the processes therein described. My improved method is, however, not limited to the production of finely divided iron, but on the contrary is applicable to the production of many other metals in a finely divided state, including zinc, lead, tin, copper, cobalt, cadmium, tungsten, molybdenum, and other metals whose oxids or other compounds can be reduced by hydrogen.

It is known that when iron and many other metals are produced in a finely divided state by reduction by hydrogen from their oxids or other suitable compounds, and the finely divided metal is exposed to the air, spontaneous combustion occurs and the oxids are again formed. Finely divided metals in this condition are said to be pyrophoric. By my improved process I am enabled to produce finely divided metals by reduction by hydrogen which are non-pyrophoric. In the processes described in the hereinbefore mentioned patents, oxidation upon exposure to the air is prevented by flooding the reduced mass with water. I have discovered that the spontaneous combustion which takes place when finely divided so-called pyrophoric metals are exposed to the air is due to the presence of hydrogen remaining in the finely divided reduced mass, and that the finely divided product may be rendered non-pyrophoric by removing the hydrogen. This may be accomplished by passing nitrogen or some other suitable inert gas through the reduced mass so as to displace the hydrogen. The resulting product is non-pyrophoric.

As an example of the manner in which my invention may be carried out, I proceed as follows:—A retort or other suitable vessel is charged with finely divided oxid of iron— for instance, ferric oxid ($Fe_2O_3$)—and is subjected to the reducing action of hydrogen at a suitable high temperature, for example, from 1000° to 1200° F. The heating of the material may be performed by heating the retort and also by heating the hydrogen before its introduction into the retort. The time required for the reduction depends upon the special conditions of the charge and of the apparatus. After the reduction, the reduced mass is allowed to cool slowly in an atmosphere of hydrogen. After the apparatus and the reduced mass have cooled down sufficiently, for example, to normal temperatures, a current of nitrogen or other inert gas is passed into the retort and through the reduced mass, so as to displace the hydrogen, care being taken to prevent access of air or oxygen to the reduced mass. After the hydrogen has been displaced completely from the reduced mass by the nitrogen, it may safely be exposed to the atmospheric air without danger of spontaneous oxidation. The non-pyrophoric finely divided metal resulting from my improved process is not only free from oxids but is also free from hydrates or hydroxids, whereas the finely divided iron made by the process disclosed in my prior Patents Nos. 727,117 and 727,118 is at least partially hydrated.

I have found that finely divided iron prepared in accordance with my present invention is electrolytically active and has valuable properties for use in the negative electrodes of alkaline storage batteries, such as are described in my prior patents, and in which the positive elements are made up of tubes loaded with flake nickel and nickel hydroxid, and the negative elements are made up of pockets containing compressed therein a mixture of electrolytically-active finely-divided iron with a small percentage of mercury. When finely divided iron made by the process of my present invention is employed in the negative elements of such storage batteries, the battery has an increased capacity, and its capacity and activity are much less impaired by low temperatures than is the case where finely divided iron is prepared by methods previously employed. The non-pyrophoric finely divided iron prepared by this process may be mixed with mercury and packed in the pockets of the negative electrodes, as is described in my prior patents.

Having now described my invention, what I claim and desire to protect by Letters Patent of the United States is as follows:—

1. The method of producing finely divided metal, which consists in reducing the same from a suitable compound by hydrogen, and in displacing the hydrogen from the reduced mass by nitrogen before exposing the mass to the atmospheric air, substantially as set forth.

2. The method of producing finely divided iron, which consists in reducing the same from a suitable compound by hydrogen, and in displacing the hydrogen from the reduced mass by an inert gas, substantially as set forth.

3. The method of producing finely divided iron, which consists in reducing the same from a suitable compound by hydrogen, and in displacing the hydrogen from the reduced mass by nitrogen, substantially as set forth.

4. The method of manufacturing non-pyrophoric finely-divided metal, which consists in reducing an oxid of the metal by hydrogen, cooling the reduced mass in the presence of hydrogen, and displacing the hydrogen by an inert gas, substantially as set forth.

5. The method of manufacturing non-pyrophoric finely-divided metal, which consists in reducing an oxid of the metal by hydrogen, cooling the reduced mass in the presence of hydrogen, and displacing the hydrogen by nitrogen, substantially as set forth.

6. The method of manufacturing non-pyrophoric finely-divided iron which consists in reducing an oxid of iron by hydrogen, cooling the reduced mass in the presence of hydrogen, and displacing the hydrogen by an inert gas, substantially as set forth.

7. The method of manufacturing non-pyrophoric finely-divided iron which consists in reducing an oxid of iron by hydrogen, cooling the reduced mass in the presence of hydrogen, and displacing the hydrogen by nitrogen, substantially as set forth.

8. A new composition of matter consisting of non-pyrophoric electrolytically-active iron in finely divided highly porous condition and free from hydrates or hydroxids, substantially as described.

9. Non-pyrophoric electrolytically-active iron, in finely divided highly porous condition and having its particles free from oxygen compounds of iron, substantially as described.

10. A new composition of matter consisting of non-pyrophoric electrolytically active iron in finely divided highly porous condition, substantially as described.

11. A new composition of matter consisting of non-pyrophoric electrolytically active metal in finely divided highly porous condition, substantially as described.

This specification signed and witnessed this 20th day of December, 1911.

THOS. A. EDISON.

Witnesses:
HENRY LANAHAN,
ANNA R. KLEHM.